(12) United States Patent
Pan et al.

(10) Patent No.: US 7,186,110 B2
(45) Date of Patent: Mar. 6, 2007

(54) APPARATUS OF MAKING WEDGED PLATES

(75) Inventors: Francis Chung Hwa Pan, No. 7, Da-Tun 15th Street, Taichung City (TW); John Chungteh Pan, Taichung (TW); Chun-Chi Lee, Taipei (TW); Chih-Lung Chen, Taipei (TW)

(73) Assignee: Francis Chung Hwa Pan, Taichung (TW)

( * ) Notice: Subject to any disclaimer, the term of this patent is extended or adjusted under 35 U.S.C. 154(b) by 330 days.

(21) Appl. No.: 10/942,898

(22) Filed: Sep. 17, 2004

(65) Prior Publication Data

US 2006/0062868 A1 Mar. 23, 2006

(51) Int. Cl.
*B29C 59/00* (2006.01)

(52) U.S. Cl. .................. 425/380; 425/308; 425/363
(58) Field of Classification Search ........... 425/308, 425/363, 380
See application file for complete search history.

(56) References Cited

U.S. PATENT DOCUMENTS 5,030,079 A * 7/1991 Benzing, II ............... 425/140
6,910,875 B2 * 6/2005 Shimazaki ................ 425/327

* cited by examiner

*Primary Examiner*—Joseph S. Del Sole
(74) *Attorney, Agent, or Firm*—Birch, Stewart, Kolasch & Birch, LLP

(57) ABSTRACT

An apparatus for making wedged plate has an extruder to provide melted plastic material. A die head has a channel with an inlet and an outlet. The inlet of the die head is connected to an outlet of the extruder. The outlet of the die head has a thick side and a narrow side. A rolling device has two rollers and a space between the rollers. The space has a thick portion and a narrow portion at opposite sides. The space of the rolling device is aligned with the outlet of the die head, so that the plastic material flows into the space of the rolling device via the die head and is rolled by the rollers. A cutting device is arranged behind the rolling device to cut the rolled plastic material to get wedged plates.

14 Claims, 6 Drawing Sheets

APPARATUS OF MAKING WEDGED PLATES

BACKGROUND OF THE INVENTION

1. Field of the Invention

The present invention relates generally to an apparatus for making plates, and more particularly to an apparatus for making wedged plates.

2. Description of the Related Art

A conventional liquid crystal display (LCD) has a backlight module, which is typically classified into a direct-lighting backlight module and an edge-lighting backlight module. The edge-lighting backlight module has a light guide plate, which usually is a wedged plate and is made of Polymethyl methacrylate (PMMA), Polycarbonate (PC) Cyclic Olefins Polymer (COP) or Cyclic Olefins Copolymer (COC).

The light guide plate usually is made by injection molding, in which an injector is applied to inject melted plastic into a cavity of a mold. After the plastic has been solidified, the mold is opened to take the plate out. After that, the mold is closed to take next injection process. Injection molding is too slow for mass production because only one plate is molded in each process. While molding the large plate by injection molding, the plate might warp. In addition, the plate made by injection molding usually has unstable optical properties because there is residue stress in the plate.

SUMMARY OF THE INVENTION

The primary objective of the present invention is to provide an apparatus for making wedged plates, which is fast for mass production and has no residue stress in the plate.

According to the objective of the present invention, an apparatus comprises an extruder having an inlet, a heater and an outlet. A plastic material is fed into the extruder via the inlet, melted by the heater and extruded out of the extruder via the outlet. A die head has a channel with an inlet and an outlet. The inlet of the die head is connected to the outlet of the extruder. A rolling device has two rollers, each of which has an axle and a circumference, wherein a space between the rollers has at least a thick portion and at least a narrow portion. The thick portion has a height, which is a distance between the circumferences of the rollers, is greater than that of the narrow portion. The space of the rolling device is aligned with the outlet of the die head and the outlet of the die head has a shape corresponding to the space, so that the plastic material flows into the space of the rolling device via the channel of the die head and is rolled by the rollers. A cutting device is arranged behind the rolling device to cut the plastic material rolled by the rolling device to get wedged plates.

DETAILED DESCRIPTION OF THE INVENTION

Figure 1:
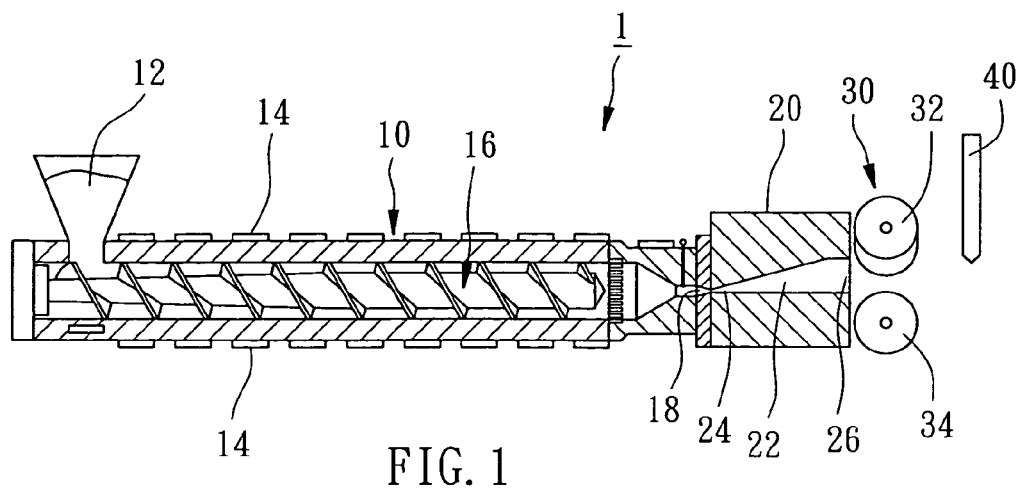
FIG. 1 is a sectional view of a first preferred embodiment of the present invention.

As shown in FIG. 1, an apparatus 1 for making wedged plates of the first preferred embodiment of the present invention comprises an extruder 10, a die head 20, a rolling device 30 and a cutting device 40.

The extruder 10 has an inlet 12, a plurality of heaters 14, a screw bar 16 and an outlet 18. Plastic powder or pellets (not shown) is fed to the extruder 10 via the inlet 12, the heaters 14 melt the plastic and the screw bar 16 extrudes the melted plastic out of the extruder 10 via the out let 18.

Figure 2:
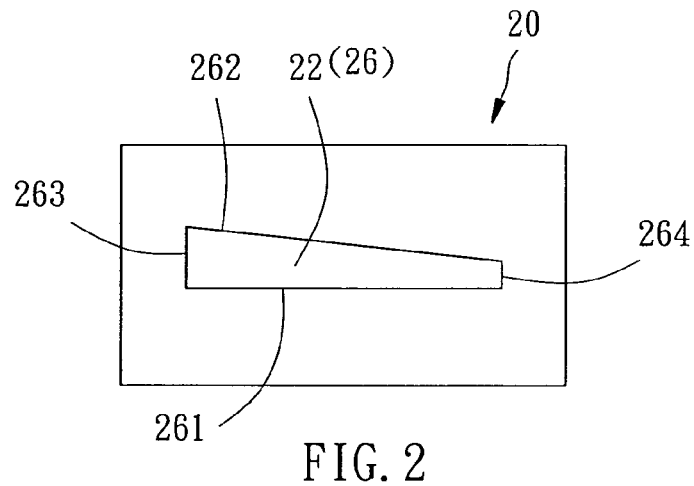
FIG. 2 is a rear view of the die head of the first preferred embodiment of the present invention.

The die head 20 has a channel 22 therein with an inlet 24 and an outlet at opposite ends thereof. The inlet 24 of the die head 20 is connected to the outlet 18 of the extruder 10, so that the melted plastic can flow into the channel 22 of the die head 20. As shown in FIG. 2, the outlet 26 of the channel 22 has a shape substantially like a wedge, which has a bottom side 261, a top side 262, a first lateral side 263 and a second lateral side 264. A height of the first side 263 is greater than that of the second lateral side 264, in other words, the outlet 26 is thick at the first lateral side 263 and is tapered to the second lateral side 264 (the narrow side). The plastic flows out of the outlet 26 of the die head 20 is not solidified yet but is pre-molded into a wedge flow.

Figure 3:
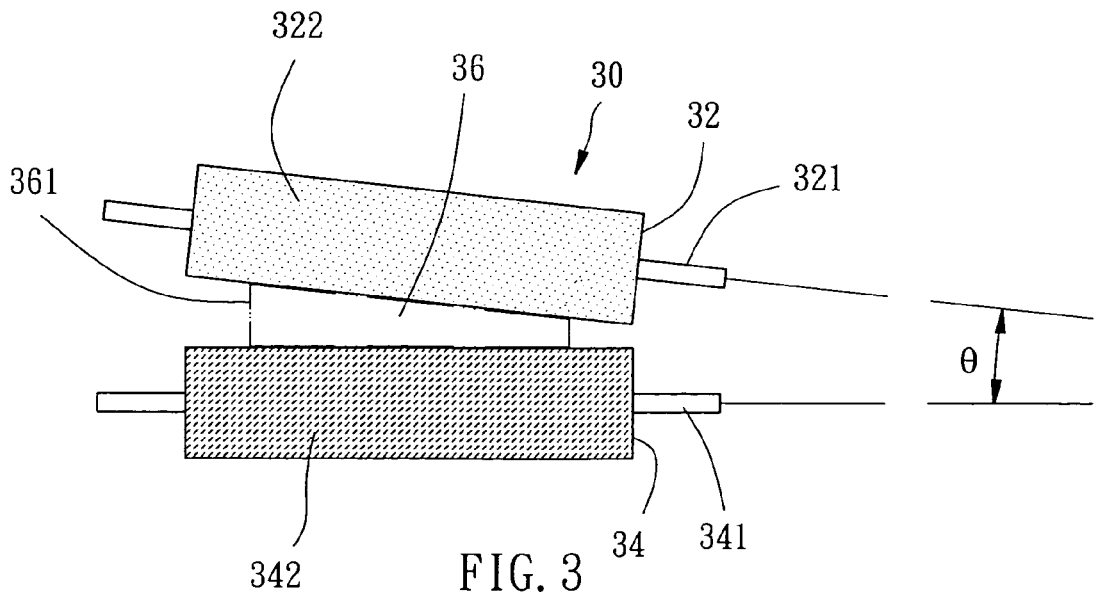
FIG. 3 is a front view of the rolling device of the first preferred embodiment of the present invention.

As shown in FIG. 3, the rolling device 30 has two rollers 32 and 34, each of which has an axle 321 and 341 and a circumference 322 and 342. The axles 321 and 341 of the rollers 32 and 34 are not parallel, in other words, extended lines of the axles 321 and 341 are cross and there is an included angle θ between the extended lines. The circumferences 322 and 342 of the rollers 32 and 34 have a texture T respectively. There is a space 36 between the circumferences 322 and 342 of the rollers 32 and 34. The space 36 has a thick portion 361 at an end thereof and a narrow portion 362 at the other end thereof. The thick portion 361 has a distance between the circumferences 322 and 342 of the rollers 32 and 34 is greater than that of the narrow portion 362. The thick portion 361 of the space 36 faces the first lateral side 263 (the thick side) of the outlet 26 of the die head 20 and the narrow portion 362 faces the second lateral side 264. The plastic flowing out of the outlet 26 of the die head 20 flows into the space 36 of the rolling device 30 and is rolled by the rollers 32 and 34 to get an elongated wedged plate. The elongated wedged plate has surface profiles on opposite sides thereof because of the textures T of the rollers 32 and 34.

Figure 4:
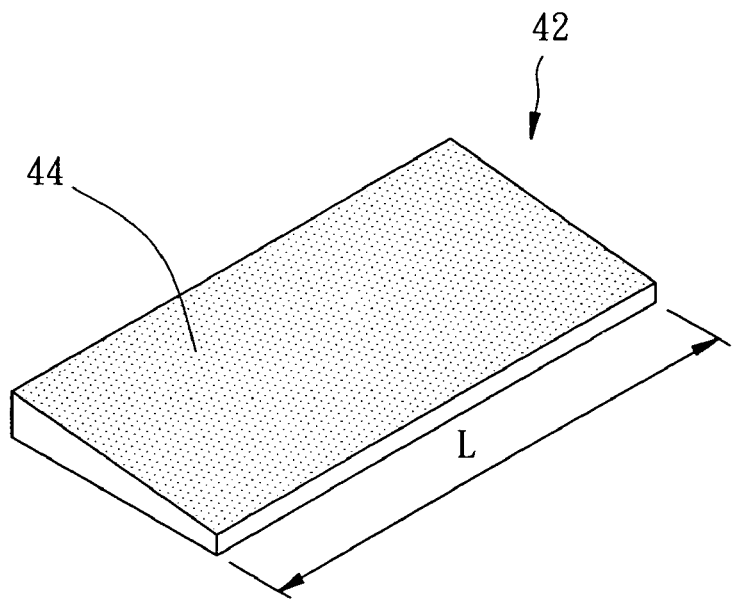
FIG. 4 is a perspective view of the wedged plate made from the apparatus of the first preferred embodiment of the present invention.

The cut device 40 is arranged behind the rolling device 30 to cut the elongated wedge plate into a plurality of wedged plates 42 with a predetermined length L and with the surface profiles 44 on opposite sides thereof, as shown in FIG. 4.

The apparatus of the present invention fabricates the wedged plates 42 in a continuously procedure. It is faster to fabricate the wedged plates 42 to meet the requirement of mass production.

Figure 5:
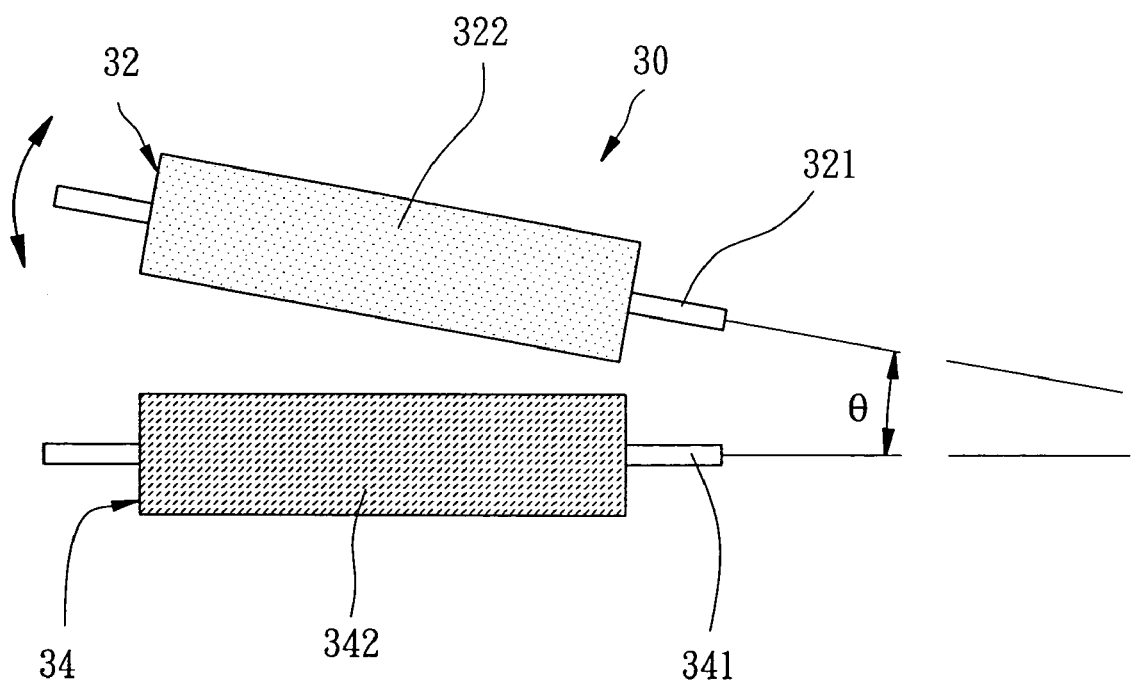
FIG. 5 is a front view of the rolling device of the first preferred embodiment of the present invention, showing the included angle of the axles of the rollers being adjustable.
Figure 6:
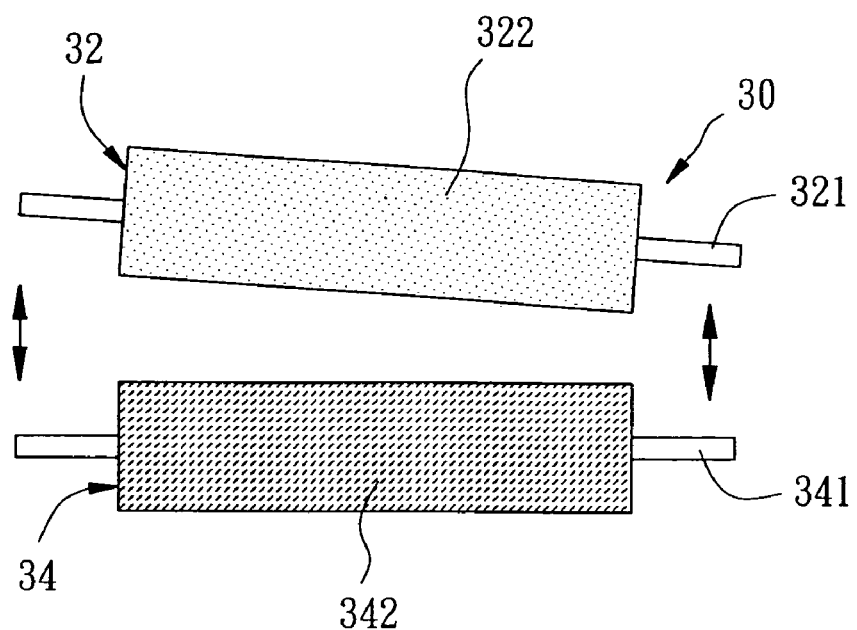
FIG. 6 is a front view of the rolling device of the first preferred embodiment of the present invention, showing the distance between the rollers being adjustable.

To fabricate various sizes of the wedged plates by the apparatus of the present invention, the included angle θ of the axles 321 and 341 of the rollers 32 and 34 is designated to be adjustable (seeing FIG. 5) and a distance between the rollers 32 and 34 also is designated to be adjustable (seeing FIG. 6).

Figure 7:
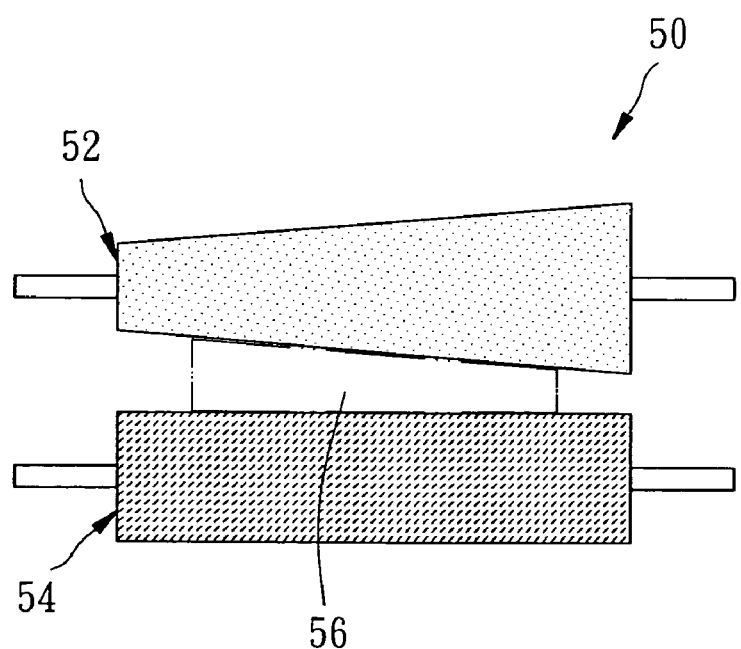
FIG. 7 is a front view of the rolling device of a second preferred embodiment of the present invention.

FIG. 7 shows a rolling device 50 of the second preferred embodiment of the present invention. The rolling device 50 has two roller 52 and 54, one of which is a round column and the other of which is a cone. There is a space 56 between the roller 52 and 54 and the space 56 is wedged. In practice, both of the rollers can be cones.

Figure 8:
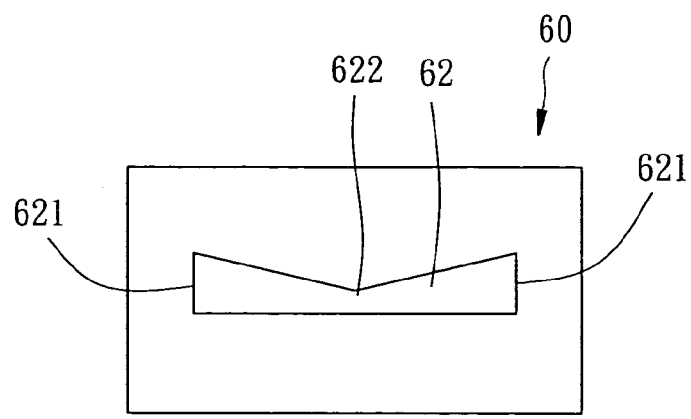
FIG. 8 is a rear view of the die head of the second preferred embodiment of the present invention.
Figure 9:
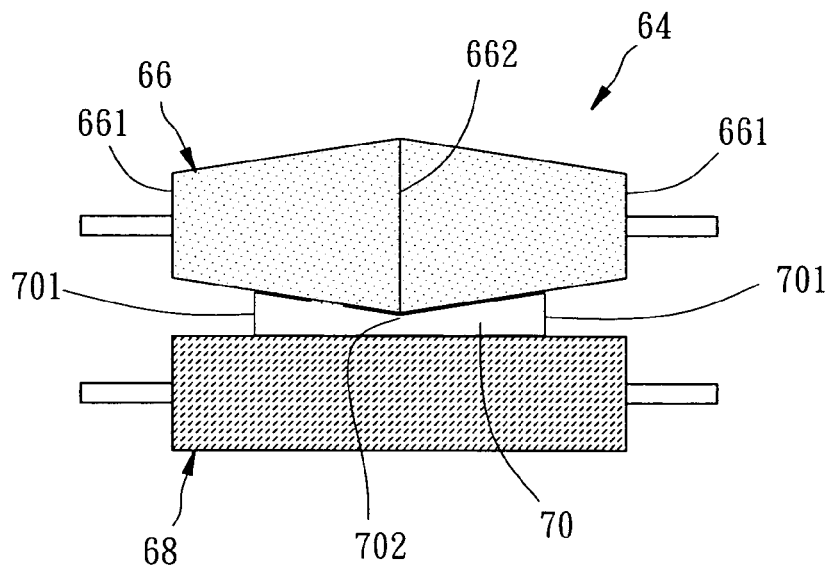
FIG. 9 is a front view of the rolling device of a third preferred embodiment of the present invention.

FIG. 8 shows a die head 62 of the third preferred embodiment of the present invention. An outlet of the die head 62 has two thick portions 621 at opposite sides thereof and a narrow portion 622 at middle thereof. FIG. 9 shows a rolling device 64 of the third preferred embodiment of the present invention. The rolling device 64 has two rollers 66 and 68, one of which 66 has two small diameter portions 661 at opposite ends thereof and a large diameter portion 662 at middle thereof and the other one of which 68 is a round column. Therefore, a space 70 between the rollers 66 and 68 has thick portions 701 at opposite sides thereof and a narrow portion 702 at middle.

Figure 10:
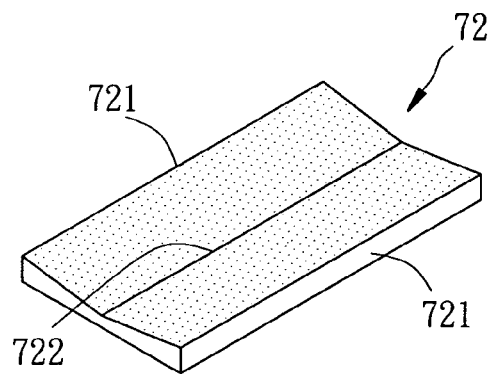
FIG. 10 is perspective view of the plate before cutting made from the apparatus of the third preferred embodiment of the present invention.
Figure 11:
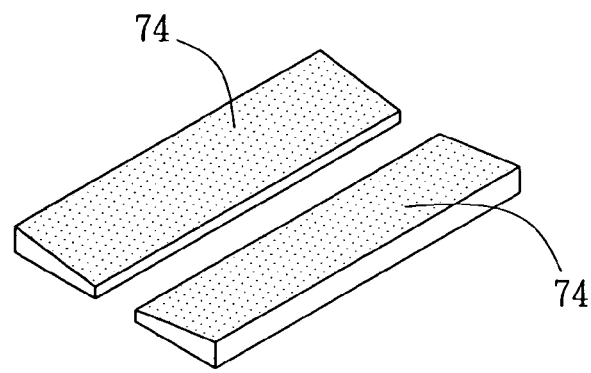
FIG. 11 is perspective view of the plate of FIG. 10 being cut along the longitudinal orientation to get two wedged plates.
Figure 12:
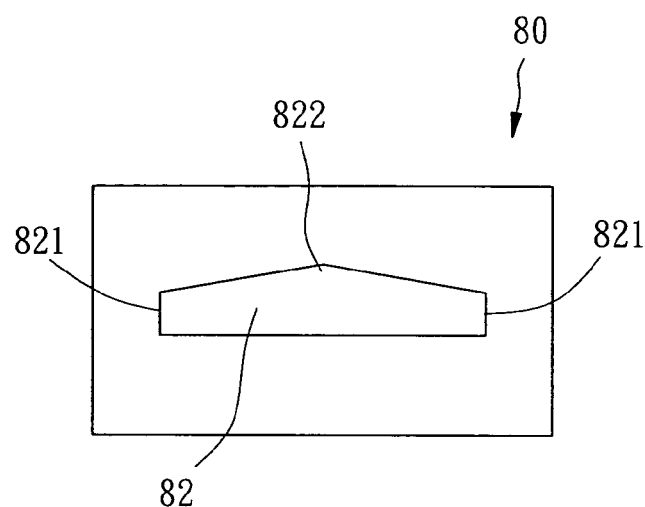
FIG. 12 is a rear view of the die head of a fourth preferred embodiment of the present invention.

A plastic plate 72, as shown in FIG. 10, rolled by the rolling device 64 has two thick sides 721 and a narrow portion 722 at middle. A cutting device (not shown) cut the plate 72 latitudinally and longitudinally (along the narrow portion 722) to get wedged plates 74, as shown in FIG. 11.

Figure 13:
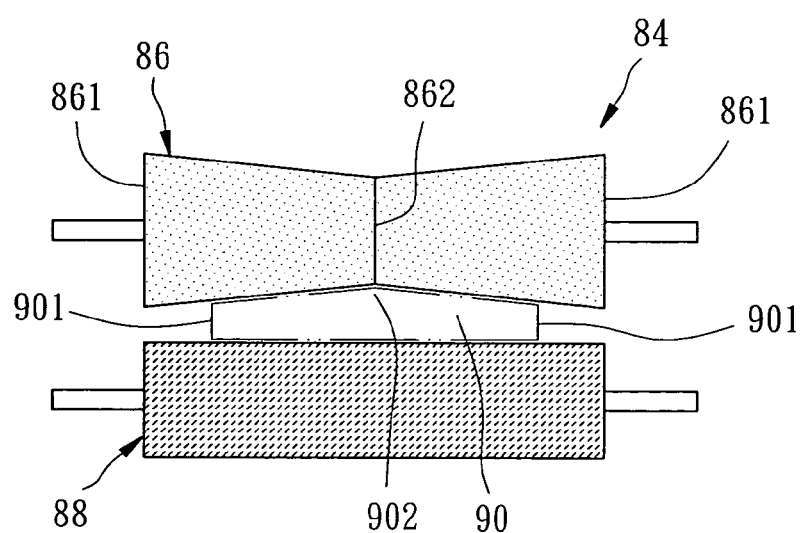
FIG. 13 is a front view of the rolling device of the fourth preferred embodiment of the present invention.
Figure 14:
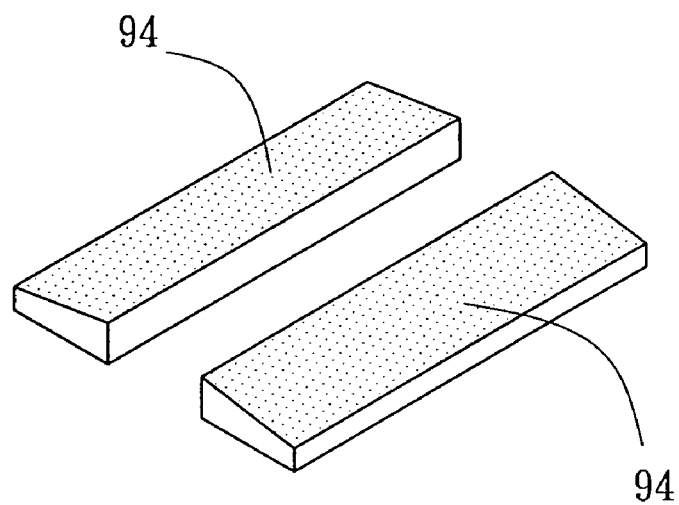
FIG. 14 is perspective view of the wedged plates made from the apparatus of the fourth preferred embodiment of the present invention.

FIG. 13 and FIG. 14 show an apparatus of the fourth preferred embodiment, which is similar to the third preferred embodiment. A die head 82 has an outlet 82 with two narrow portions 821 at opposite sides and a thick portion 822 at middle. A rolling device 84 has two rollers 86 and 88, one of which 86 has two large diameter portions 861 at opposite ends and a small diameter portion 862 at middle and the other one of which 88 is a round column. Therefore, a space 90 between the rollers 86 and 88 has two narrow portions 901 at opposite sides and a thick portion 902 at middle.

A plate rolled by the rolling device 84 is cut latitudinally and longitudinally by a cutting device (not shown) to get wedged plates 94.

Figure 15:
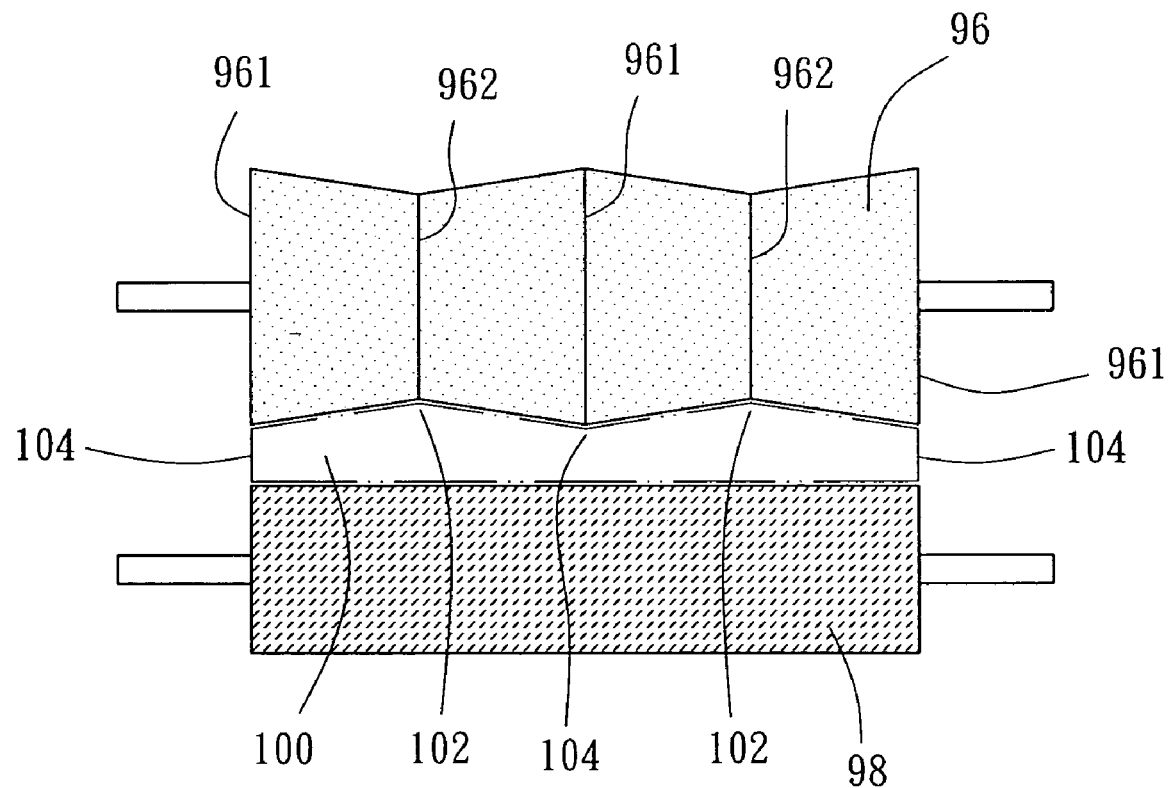
FIG. 15 is a front view of the rolling device of a fifth preferred embodiment of the present invention.

FIG. 15 shows a rolling device of the fifth preferred embodiment, which has two rollers 96 and 98. The roller 96 has plural large diameter portions 961 and small diameter portions 962 and the roller 98 is a round column. A space 100 between the rollers 96 and 98 has plural thick portions 102 and narrow portions 104. An outlet of a die head (not shown) has a shape corresponding to the space 100. A plastic plate (not shown) rolled by the rolling device is cut latitudinally and longitudinally to get plural wedged plates.

The wedged plates made by the apparatus of the present invention can be applied to many fields, such as the light plate as described above.

What is claimed is:

1. An apparatus, comprising:
   an extruder having an inlet, a heater and an outlet, wherein a plastic material is fed into the extruder via the inlet, melted by the heater and extruded out of the extruder via the outlet;
   a die head having a channel with an inlet and an outlet, wherein the inlet of the die head is connected to the outlet of the extruder;
   a rolling device having two rollers, each of which has an axle and a circumference, wherein a space between the rollers has at least a thick portion and at least a narrow portion, wherein the thick portion has a height, which is a distance between the circumferences of the rollers, which is greater than that of the narrow portion;
   wherein the space of the rolling device is aligned with the outlet of the die head and the outlet of the die head has a shape corresponding to the space, so that the plastic material flows into the space of the rolling device via the channel of the die head and is rolled by the rollers, and
   a cutting device arranged behind the rolling device to cut the plastic material rolled by the rolling device to get wedged plates.

2. The apparatus as defined in claim 1, wherein the space of the rolling device has the thick portion and the narrow portion at opposite sides thereof.

3. The apparatus as defined in claim 2, wherein extended lines of the axles of the rollers are crossed and there is an included angle between the extended lines.

4. The substrate as defined in claim 3, wherein the rollers are adjustable to change the included angle of the axles of the rollers.

5. The apparatus as defined in claim 2, wherein the roller of the rolling device is a cone.

6. The apparatus as defined in claim 1, wherein a distance between the circumferences of the rollers is adjustable.

7. The apparatus as defined in claim 1, wherein the roller of the rolling device has a texture on the circumference.

8. The apparatus as defined in claim 1, wherein the space of the rolling device has two the portions at opposite sides thereof and one narrow portion between the thick portions and the cutting device cuts the rolled plastic material latitudinally and cuts the plastic material along a narrow portion thereof.

9. The apparatus as defined in claim 8, wherein the roller has two small diameter portions at opposite ends thereof and a large diameter portion between the small diameter portions.

10. The apparatus as defined in claim 8, wherein the roller of the rolling device has a texture on the circumference.

11. The apparatus as defined in claim 1, wherein the space of the rolling device has two narrow portions at opposite sides thereof and one thick portion between the narrow portions and the cutting device cuts the rolled plastic material latitudinally and cuts the plastic material along a thick portion thereof.

12. The apparatus as defined in claim 11, wherein the roller has two large diameter portions at opposite ends thereof and a small diameter portion between the large diameter portions.

13. The apparatus as defined in claim 11, wherein the roller of the rolling device has a texture on the circumference.

14. The apparatus as defined in claim 11, wherein the space of the rolling has a plurality of the thick portions and narrow portions alternately.

* * * * *